US012067640B2

(12) United States Patent
Argade et al.

(10) Patent No.: US 12,067,640 B2
(45) Date of Patent: Aug. 20, 2024

(54) DYNAMICALLY RECONFIGURABLE REGISTER FILE

(71) Applicant: Advanced Micro Devices, Inc., Santa Clara, CA (US)

(72) Inventors: Pramod Vasant Argade, San Diego, CA (US); Martin G. Sarov, San Diego, CA (US); Milind N. Nemlekar, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 405 days.

(21) Appl. No.: 17/214,762

(22) Filed: Mar. 26, 2021

(65) Prior Publication Data

US 2022/0309606 A1    Sep. 29, 2022

(51) Int. Cl.
*G06T 1/20* (2006.01)
*G06F 9/30* (2018.01)
*G06F 9/52* (2006.01)
*G06T 1/60* (2006.01)

(52) U.S. Cl.
CPC ............ *G06T 1/20* (2013.01); *G06F 9/30105* (2013.01); *G06F 9/3012* (2013.01); *G06F 9/524* (2013.01); *G06T 1/60* (2013.01)

(58) Field of Classification Search
CPC ......... G06T 1/20; G06T 1/60; G06F 9/30105; G06F 9/3012; G06F 9/524; G06F 9/3004
USPC .................................................. 345/530, 559
See application file for complete search history.

(56) References Cited

U.S. PATENT DOCUMENTS

| 2017/0139707 A1* | 5/2017 | Jang .................... G06F 9/3012 |
| 2018/0096446 A1* | 4/2018 | Chen ................... G06F 9/30076 |
| 2019/0087241 A1* | 3/2019 | Kothinti Naresh ..... G06F 9/524 |

* cited by examiner

Primary Examiner — Jacinta M Crawford
(74) Attorney, Agent, or Firm — Volpe Koenig

(57) ABSTRACT

Techniques for managing register allocation are provided. The techniques include detecting a first request to allocate first registers for a first wavefront; first determining, based on allocation information, that allocating the first registers to the first wavefront would result in a condition in which a deadlock is possible; in response to the first determining, refraining from allocating the first registers to the first wavefront; detecting a second request to allocate second registers for a second wavefront; second determining, based on the allocation information, that allocating the second registers to the second wavefront would result in a condition in which deadlock is not possible; and in response to the second determining, allocating the second registers to the second wavefront.

21 Claims, 5 Drawing Sheets

DYNAMICALLY RECONFIGURABLE REGISTER FILE

BACKGROUND

Graphics processing units include parallel processing elements that execute programs in a highly parallel manner. These shader programs access registers to perform calculations. Allocating registers across the many instances of parallel execution is an important aspect of graphics processing unit execution.

BRIEF DESCRIPTION OF THE DRAWINGS

A more detailed understanding can be had from the following description, given by way of example in conjunction with the accompanying drawings wherein.

DETAILED DESCRIPTION

Techniques for managing register allocation are provided. The techniques include detecting a first request to allocate first registers for a first wavefront; first determining, based on allocation information, that allocating the first registers to the first wavefront would result in a condition in which a deadlock is possible; in response to the first determining, refraining from allocating the first registers to the first wavefront; detecting a second request to allocate second registers for a second wavefront; second determining, based on the allocation information, that allocating the second registers to the second wavefront would result in a condition in which deadlock is not possible; and in response to the second determining, allocating the second registers to the second wavefront.

Figure 1:
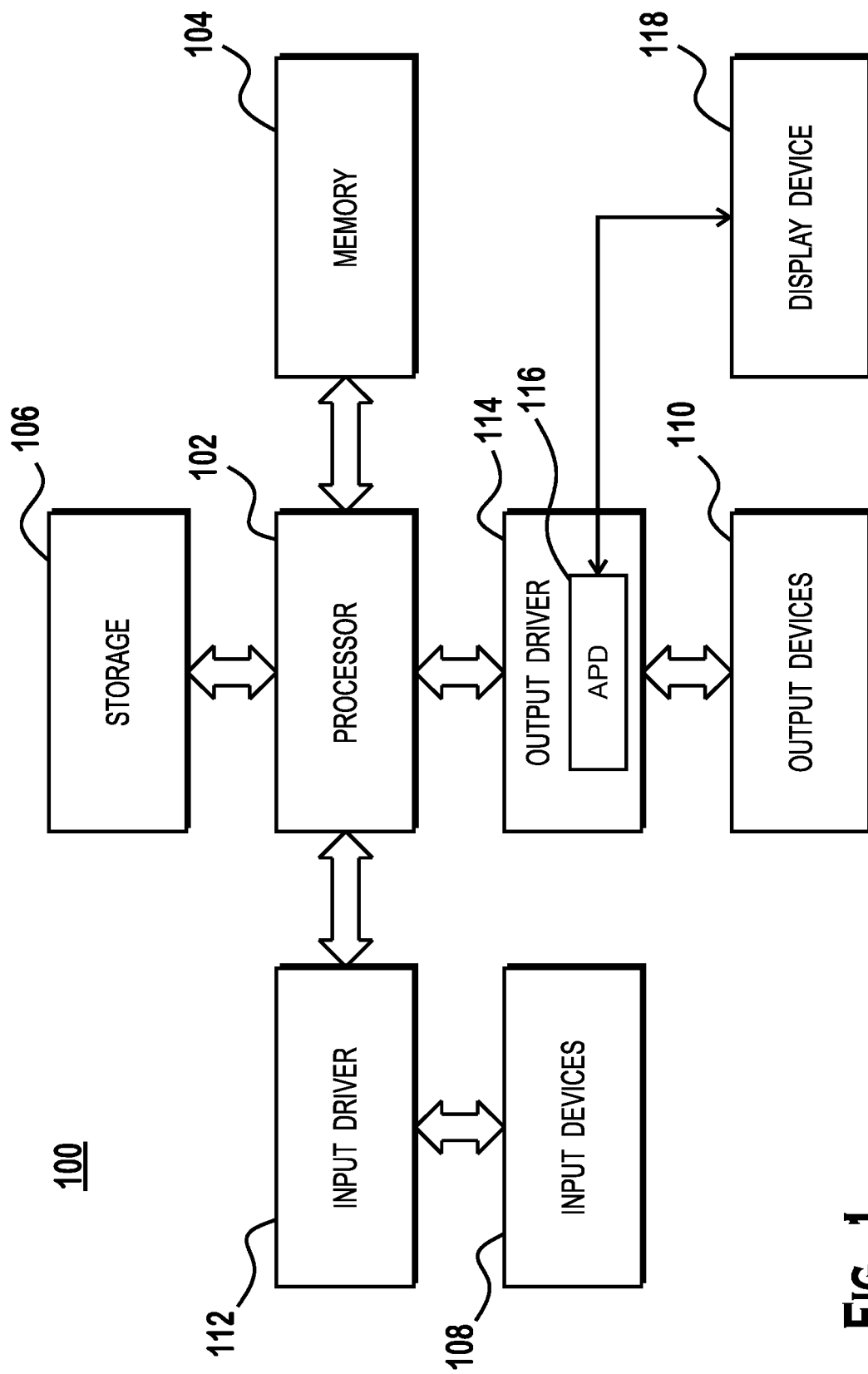
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
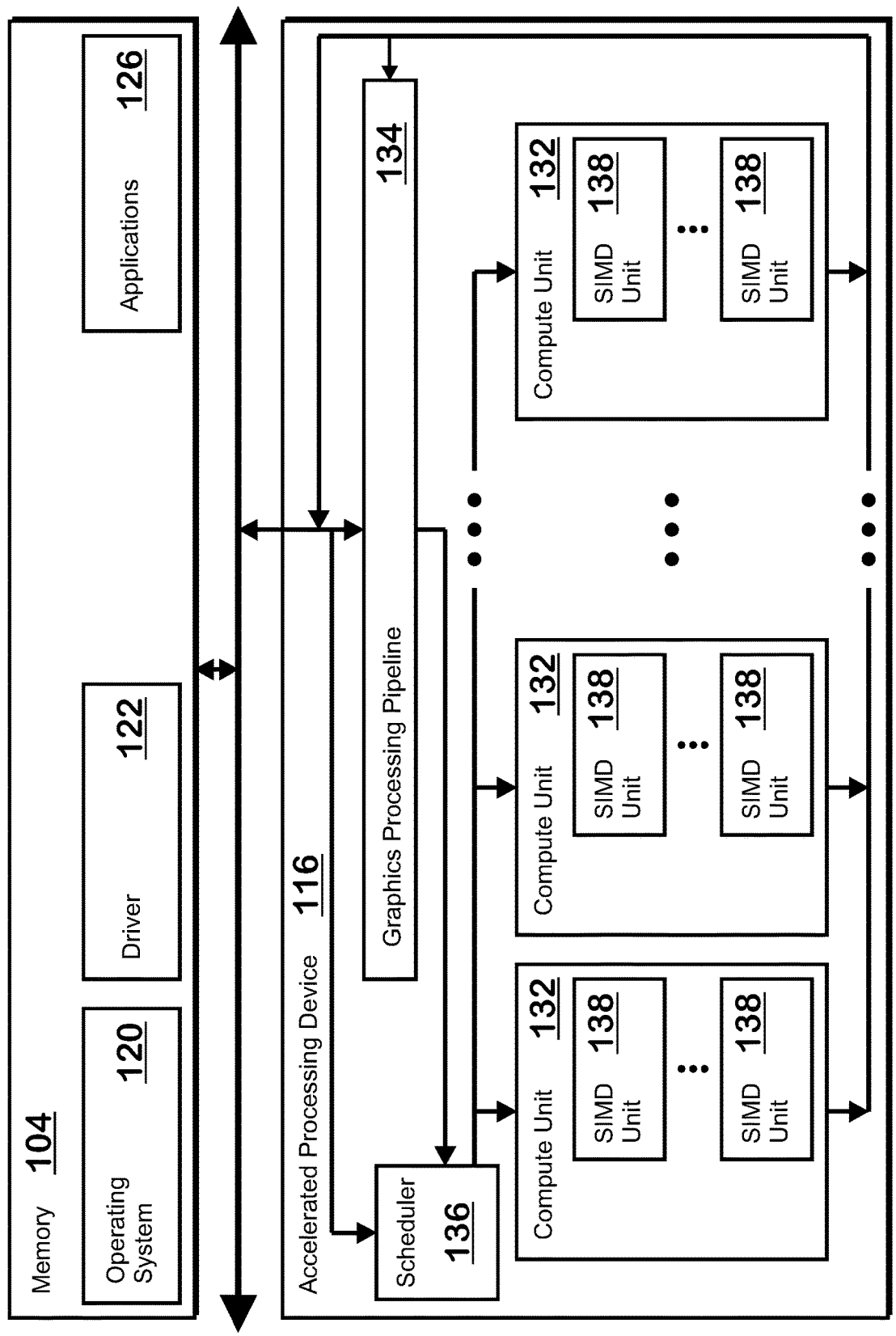
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A command processor 136 performs operations related to scheduling various workgroups on different compute units 132 and SIMD units 138. In general, the command processor 136 receives commands from an entity such as the processor 102, where the commands instruct the APD 116 to perform tasks such as graphics rendering, executing general purpose shaders, or the like.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution. In other examples, the compute units 132 are capable of performing operations to accelerate a variety of workloads, such as computation for high performance computing.

Figure 3:
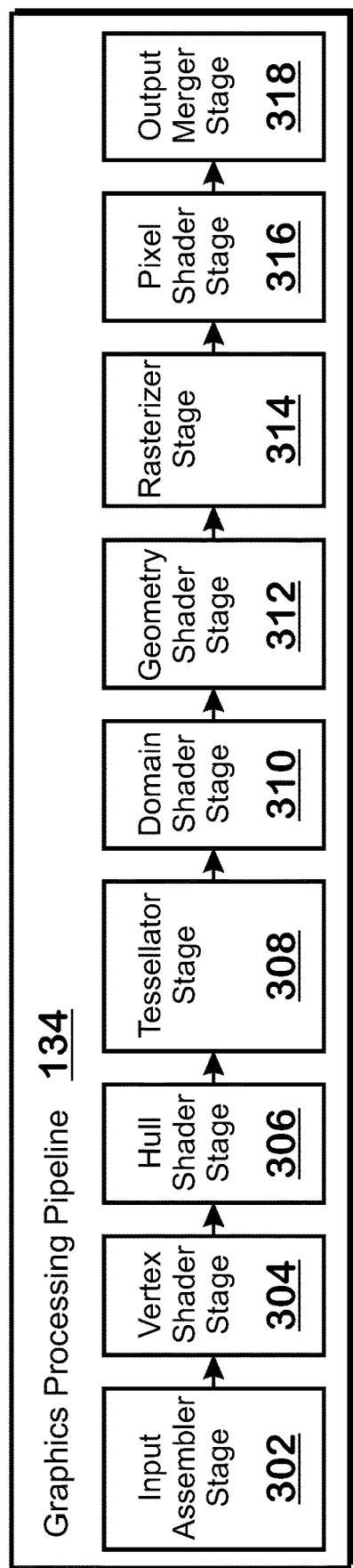
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-tocubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

It should be understood that, although a graphics processing pipeline 134 is illustrated as included within the APD 116, implementations of the APD 116 that do not include a graphics processing pipeline 134 (but that do include the compute units 132 which execute shader programs such as general purpose compute shader programs) are contemplated by the present disclosure.

During rendering, the processor 102 sends commands to the APD 116 to render geometry, and specifies shader programs used for such rendering. For example, for a first set of geometry, the processor 102 specifies specific shader programs to execute for various stages of the graphics processing pipeline 134 such as the vertex shader stage 304 and the pixel shader stage 316, and for a second set of geometry, the processor 102 specifies a different set of shader programs to execute for those stages of the graphics processing pipeline 134.

Shader programs include indications of a required number of resources such as registers. Registers are low latency scratch space used by instructions of a shader program. Instructions read from and write to such registers while performing calculations. Use of registers, as opposed to writing to memory, is beneficial, as register access typically has much lower latency than access to memory.

Shader program register requirements refer to the number of registers required to be made available to a shader program during execution. In some examples, these requirements are based on the number of concurrent values needed to be tracked during execution of the shader program. In some examples, a compiler identifies a maximum number of concurrent values to be used for a shader program and includes, for such compiled shader program, an indication of such maximum number. In some examples, the register requirements refer to the requirements for a wavefront, which is a collection of work-items that execute together. Thus, the register requirements are registers that need to be reserved for all of the work-items in a wavefront. In some implementations, the hardware (e.g., SIMD unit 138) has a maximum number of registers that could be made available to any instance (e.g., wavefront) of execution of a shader program.

Because of the low latency of register access, making a greater number of registers available for a shader program is generally beneficial, to the extent that such shader program actually needs those registers. However, there is another factor that conflicts with assigning a greater number of registers to shader programs. Specifically, a compute unit 132 has a limited number of registers. Thus, executing wavefronts with a higher number of register requirements results in a smaller number of wavefronts that can execute concurrently on a compute unit 132. The term "occupancy" as used herein refers to the number of wavefronts that can execute concurrently on a compute unit 132. Thus, a phrase such as "increase occupancy" refers to increasing the number of wavefronts that can execute concurrently on the compute unit 132. Occupancy could be increased by increasing the total number of registers. However, each compute unit 132 is capable of executing multiple wavefronts, and the APD 116 (in some examples) include multiple compute units 132. Increasing the number of registers for each work-item would thus result in a large increase in total registers for the APD 116. Because registers consume a large amount of die area, improving occupancy by increasing the total number of registers increase the total die area.

In some instances, compilers combine multiple user-supplied shader programs into single "monolithic" shader programs. In such monolithic shader programs, a selection operation selects one of the individual user-supplied shader programs for execution based on an input. In an example, ray tracing workloads involve casting a ray from a camera to scene geometry, determining a primitive intersected by the ray, and executing a material shader for the primitive to color a pixel associated with the ray. Because any primitive may have any of a wide variety of material shaders, any particular ray may result in the execution of any of a large number of material shaders. Combining the different material shaders into a single monolithic material shader that includes a selection operation that selects the portion associated with a desired material shader, rather than requiring any of a variety of shader programs to execute, results in certain efficiencies. In some implementation, all shaders for ray racing are combined into a single shader. These shaders include shaders such as ray generation shaders, which generate rays to be casted, hit shaders, and miss shaders, acceleration structure (such as bounding volume hierarchy) traversal shaders, and other shaders involved in ray tracing.

Combining shader programs in this manner provides some benefits, but could result in the drawback that execution of any of the individual user-supplied shader programs is hindered by the largest register requirements out of these shader programs. In an example, the compute unit 132, upon instantiating execution of the monolithic shader program, allocates this largest number of registers. The compute unit 132 does not know which of the user-supplied shader programs will be "selected" upon execution, and thus must reserve the maximum number of registers.

Techniques are provided herein to improve occupancy, by allowing for runtime modification of the number of registers allocated to wavefronts. Specifically, these techniques include execution of instructions that, at runtime, modify the number of registers allocated to a particular wavefront. In various examples, the compiler or another entity introduces these instructions into a shader program and the compute units 132 execute the instructions to increase or decrease the number of registers allocated to particular wavefronts. With such instructions, the compute units 132 are capable of executing more wavefronts concurrently than if each such wavefront always required the maximum number of registers for any portion of the shader program. Additional details are now provided.

Figure 4:
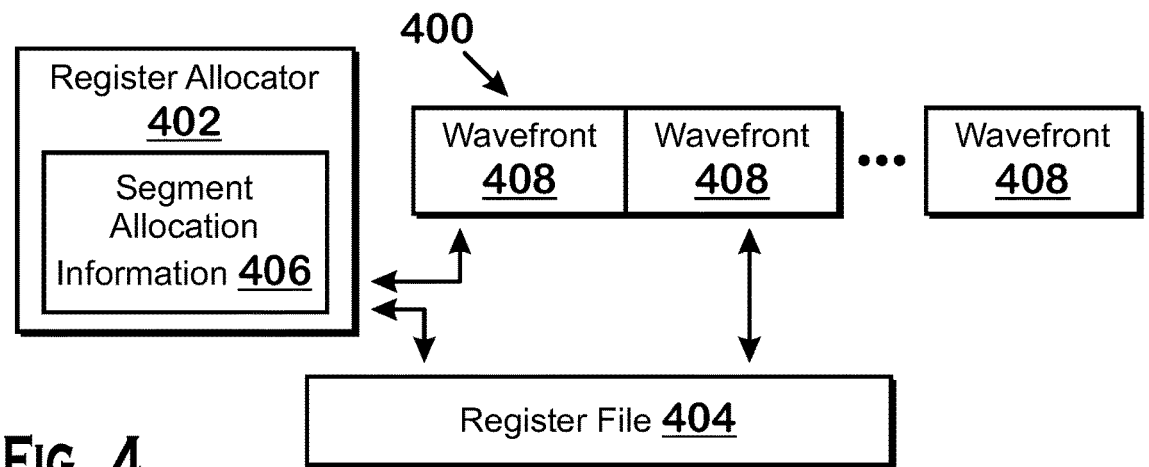
FIG. 4 illustrates a register allocation system, according to an example.

FIG. 4 illustrates a register allocation system 400, according to an example. The system 400 includes a register allocator 402 and a register file 404. The register allocator 402 includes segment allocation information 406. The register allocator 402 controls allocation of registers of the register file 404 according to instructions executed by the wavefronts 408. The wavefronts of FIG. 4 are wavefronts of the same shader program, and, in some examples, of the same workgroup. The register allocator 402 thus controls allocation of registers of the register file 404 between wavefronts 408 of a shader program invocation (in some examples, a workgroup). The register allocator 402 is implementable as hardwired circuitry configured to perform the operations described herein, software executable on a processor configured to perform the operations described herein, or a combination of software and hardware. In various examples, register allocators 402 are included within one or more compute unit 132 or SIMD units 138.

The register allocator 402 controls allocation of registers in "segments." A segment is a portion of the register file 404 that is dynamically allocable between the wavefronts 408. At any given time, the register allocator 402 assigns various segments of the register file 404 to various wavefronts 408 based on execution of instructions executed by the wavefronts 408 for requesting or relinquishing registers. In addition, shader programs specify a number of registers to allocate for wavefronts 408 upon beginning execution. The segment allocation information 406 maintains status information indicating which register file segments are allocated to which wavefronts 408.

In operation, the register allocator 402 receives indications from the wavefront 408 regarding changes to register needs and modifies register allocation accordingly. In response to receiving a request to relinquish registers from a wavefront 408, the register allocator 402 relinquishes the registers specified by the request and updates the segment allocation information 406 to indicate that the relinquished register file segments are no longer allocated to the wavefront 408. In response to receiving an indication that a wavefront 408 has completed execution, the register allocator 402 modifies the segment allocation information 406 to indicate that all of the register segments allocated to the wavefront 408 are free. In response to receiving an indication that a wavefront 408 is ready to begin execution, or that an already executing wavefront executes an instruction that requests more registers, the register allocator 402 checks the segment allocation information 406 to determine whether there are sufficient register segments for the wavefront 408. For wavefronts 408 that are ready to begin execution, in various alternatives, the wavefronts 408 indicate the number of registers required explicitly to the register allocator 402 or the register allocator 402 looks up information associated with the shader program of the wavefront 408 to determine the number of registers required for the wavefront 408 when starting. For wavefronts 408 that are already executing and are requesting additional registers, the instruction that requests additional registers indicates the number of registers requested. If sufficient registers are available, then the register allocator 402 modifies the segment allocation information 406 to indicate that the requested registers for the wavefront 408 are allocated to that wavefront 408. This action allows the wavefront 408 to continue executing, utilizing the requested registers. If sufficient registers are not available, then the register allocator 402 either prevents the wavefront 408 from beginning execution, if the APD 116 is attempting to start execution of the wavefront 408, or the register allocator 402 stalls the wavefront 408 if the wavefront 408 is already executing. The APD 116 resumes the stalled wavefront 408 in response to the requested registers becoming available for the wavefront 408.

The determination by the register allocator 402 of whether sufficient registers are available takes into account whether a deadlock would occur if a wavefront 408 is granted the requested registers. More specifically, it could be possible for wavefronts 408 to deadlock in the situation that all registers are allocated to wavefronts 408, but all wavefronts 408 require more wavefronts to complete. Thus, the register allocator 402 does not allocate registers to a wavefront 408 if such allocation could result in a deadlock. Several aspects of the determination of whether to allocate registers to wavefronts 408 in a manner that does not allow for deadlock are now provided. It should be noted that the discussion herein regarding whether deadlock will occur and which registers are available registers are allocated between wavefronts 408 that execute the same kernel, and thus have the same possibilities for register requirements. More specifically, the wavefronts 408 have the same maximum possible number of registers and the same instructions (that therefore are able to request and relinquish the same numbers of registers).

In some situations, none of the wavefronts have dependencies on each other. A dependency represents the possibility that one wavefront 408 must coordinate with another wavefront to complete execution. In one example, a wavefront 408 requires data from another wavefront. In another example, wavefronts 408 of a kernel shader program execute a barrier instruction, which requires that all wavefronts 408 arrive at the barrier before proceeding past the barrier. Any of a wide variety of other dependency types are possible.

In the situation that there are no dependencies between wavefronts 408 of a shader program, sufficient registers are available for assignment to a wavefront 408 in the situation that, after assignment to the wavefront 408 of the registers requested by that wavefront, at least one of the wavefronts 408 currently executing would be able to complete, assuming that the wavefronts 408 will require the maximum number of registers at some point in time. In other words, in this situation, sufficient registers are available where at least one wavefront 408 either currently is allocated the maximum number of registers the shader program could possibly need, or where, after allocation to the wavefront 408 requesting the registers, a sufficient number of registers are still available to grant at least one wavefront 408 the maximum number of registers the shader program could possibly need. By ensuring that at all times, sufficient registers are available such that at least one wavefront 408 could be allocated the maximum number of registers, it is guaranteed that at least one wavefront 408 could run to completion and thereby free its registers, which could be allocated to other wavefronts 408 so that those wavefronts could complete 408, and so on.

In some examples, the register allocator 402 determines how to respond to a request to allocate registers (whether for a new wavefront 408 or a wavefront 408 already executing) based on whether the wavefronts 408 are executing in one of the following conditions: condition 1: at least one wavefront 408 already has allocated the maximum number of registers that a wavefront 408 can be allocated, according to the shader program, and there are enough free registers to satisfy the request for additional registers; condition 2: the number of registers that are available is greater than or equal to the "headroom" of the wavefront 408 that makes the request, where the "headroom" is equal to the maximum number of registers the wavefront 408 could be allocated minus the number of registers allocated to the wavefront 408 prior to making the request; and condition 3: the number of registers that are free is equal to or greater than the headroom for a wavefront 408 other than the wavefront 408 making the request, added to the number of registers being requested. If any of these conditions is true, then the register allocator 402 determines that the request for allocating new registers is to be satisfied. If none of these conditions are true, then the register allocator 402 determines that the request for allocating new registers is not to be satisfied, at least until one of the conditions becomes true.

Regarding condition 1, if at least one wavefront 408 has already been allocated the maximum number of registers, then at least one wavefront 408 does not need additional registers to complete, and a deadlock condition due to there being insufficient registers to allocate will not occur. Regarding condition 2, if the number of free registers is greater than or equal to headroom of the requesting wavefront 408 (before the request is satisfied), then at least that wavefront 408 will be able to complete, since there are enough registers to eventually provide that wavefront 408 the maximum number of registers. There will be enough registers regardless of the number of registers that the requesting wavefront 408 is requesting, meaning that condition 2 does not consider the number of registers requested by the requesting wavefront 408. Regarding condition 3, if the number of free registers is greater than or equal to the headroom of a wavefront 408 other than the requesting wavefront added to the number of registers requested, then at least that other wavefront 408 will be able to complete and free its registers.

The phrase "maximum number of registers," (for example, for a wavefront 408) used herein refers to a number of registers specified for a shader program as the largest number of registers that a wavefront of the shader program could possibly request. The instructions that request and relinquish registers for a shader program modify the number of registers allocated to a wavefront to a number less than or equal to this maximum.

As described elsewhere herein, the conditions described above indicate the situations in which registers can be allocated for wavefronts with no inter-wavefront dependencies. In situations where there are dependencies, one of a set of modifications to the technique described herein is used. In one example technique, the register allocator 402 allocates registers in response to a request if the register allocator 402 determines that allocating such registers would result in a "dependent unit" being able to obtain an aggregate maximum number of registers. A dependent unit is a set of wavefronts 408 for which each wavefront 408 is either dependent on another wavefront 408 in the set is a wavefront 408 that another wavefront 408 is dependent on. An aggregate maximum number of registers for a dependent unit is the sum of the maximum number of registers for the wavefronts 408 in the dependent unit. In other words, register allocation occurs according to the set of three conditions described above, where the conditions are for dependent units rather than individual wavefronts 408. In another example technique where there are inter-wavefront dependencies, the register allocator 402 always allocates the maximum number of registers for each wavefront 408.

In some implementations, where a compiler identifies that there are dependent wavefronts, the compiler reduces the register usage for the wavefronts 408 so that forward progress can be made.

Figure 5:
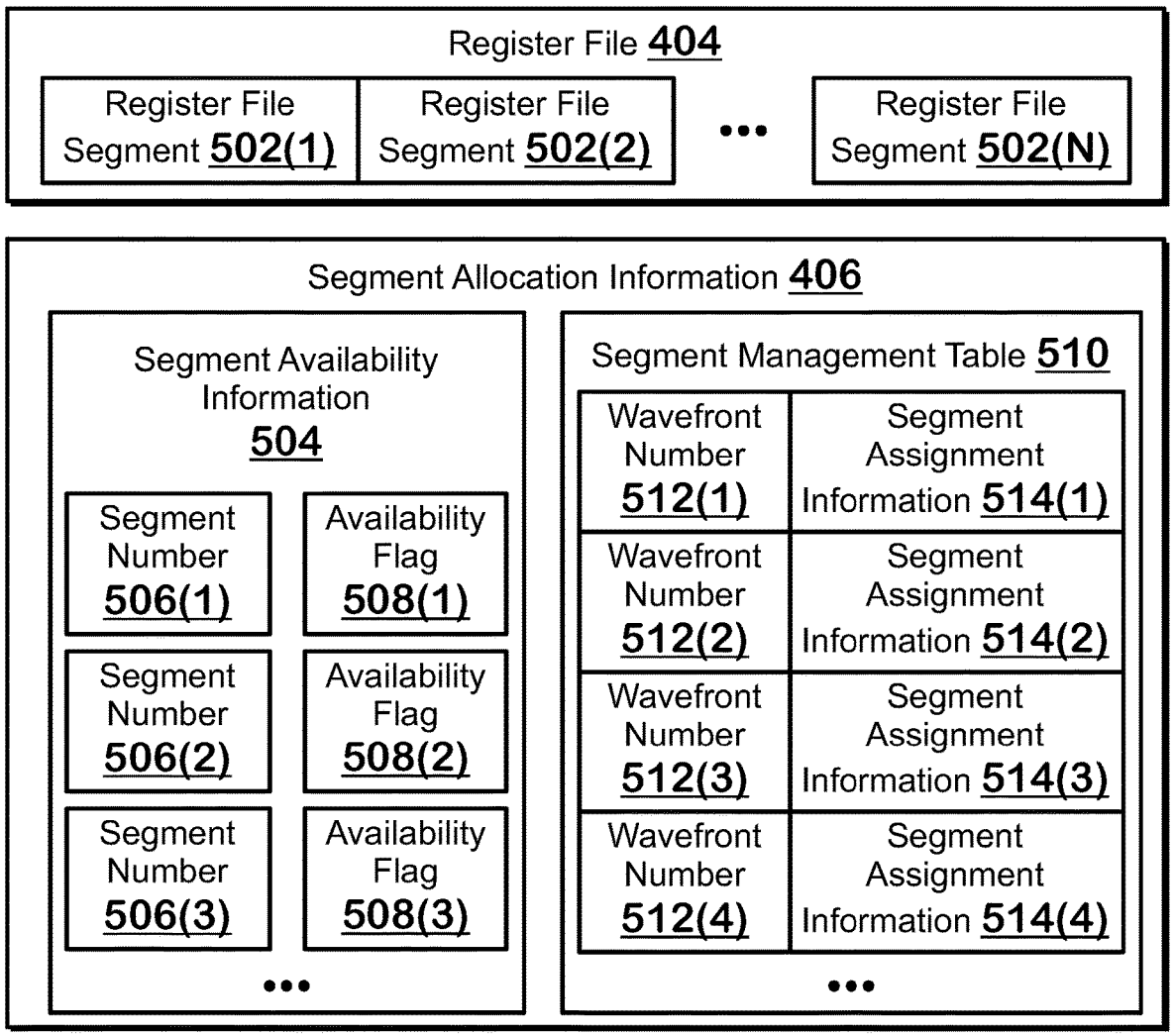
FIG. 5 illustrates aspects of the register allocation system, including additional details, according to an example.

FIG. 5 illustrates aspects of the register allocation system 400, including additional details, according to an example. It should be understood that the details illustrated in FIG. 5 represent an example implementation for the system of FIGS. 1-4, and that various departures from the example implementation of FIG. 5 fall within the scope of the present disclosure.

The register file 404 includes a number of register file segments 502, each of which includes a number of registers. The segment allocation information 406 includes segment availability information 504 and a segment management table 510. The segment management table 510 includes wavefront numbers 512 and segment assignment information 514.

The registers of the register file 404 are allocatable between wavefronts 408 at the granularity of the register file segments 502. In an example, a register file segment 502 includes 32 registers. In addition, in some examples, the wavefronts 408 access registers using the segment management table 510. Specifically, instructions of the wavefronts 408 refer to registers by register number. These register numbers include a register number base and a register number offset. The register number base are the most significant bits of the register number, and the register number offset are the least significant bits of the register number. The number of the least significant bits is equal to the number of bits needed to address all registers in a register file segment 502. The register number base identifies a register file segment 502, while the register number offset identifies a specific register within that segment.

The register numbers referenced by the wavefronts 408 are referred to herein as "wavefront register numbers" and the register numbers of the registers in the register files 404 are referred to as "physical register numbers." In addition, a wavefront register number indicates a wavefront segment number and an offset. The register file segments 502 in the register file 404 have physical segment numbers. The segment assignment information 514 includes information indicating which physical register segment numbers are assigned to which wavefront segment numbers. When a wavefront 408 accesses a register, the wavefront provides a wavefront register number. The wavefront 408 (via mapping hardware, such as hardwired circuitry, which is not shown) examines the segment assignment information 514 to identify the physical segment number mapped to the wavefront register segment, and obtains the physical register number by adding the offset to the identified physical segment number. The wavefront 408 accesses the register having the identified physical register number.

The register allocator 402 handles allocation or deallocation of register file segments 502 using the segment management table 510 and segment availability information 504. Specifically, in response to determining that a wavefront 408 is to be allocated a register file segment 502, the register allocator 402 examines the segment availability information 504 for a free segment. The segment availability information includes segment numbers 506 and availability flags 508. For each segment number 506, the corresponding availability flag 508 indicates whether that segment is free. In some implementations, these segment numbers refer to physical register segment numbers. The register allocator 402 selects a segment number 506 indicated as free and updates the segment assignment information 514 corresponding to the wavefront number 512 for the wavefront 408 making the request to indicate that the wavefront 408 is allocated that that segment. The register allocator 402 also modifies the availability flag 508 of the segment to indicate that the segment is no longer available. To relinquish a segment for a wavefront 408, the register allocator 402 updates the segment assignment information 514 for the segment to indicate that the segment is not assigned to the wavefront 408, and updates the availability flag 508 for the segment to indicate that the segment is available. In some examples, a value of 1 for the availability flag 508 indicates that a segment is available, and a value of 0 indicates that a segment is not available. In some examples, the register allocator 402 identifies the number of free segments, which is used in all three conditions described above for determining whether registers can be allocated to a wavefront 408, by summing the availability flags for all segments.

Figure 6:
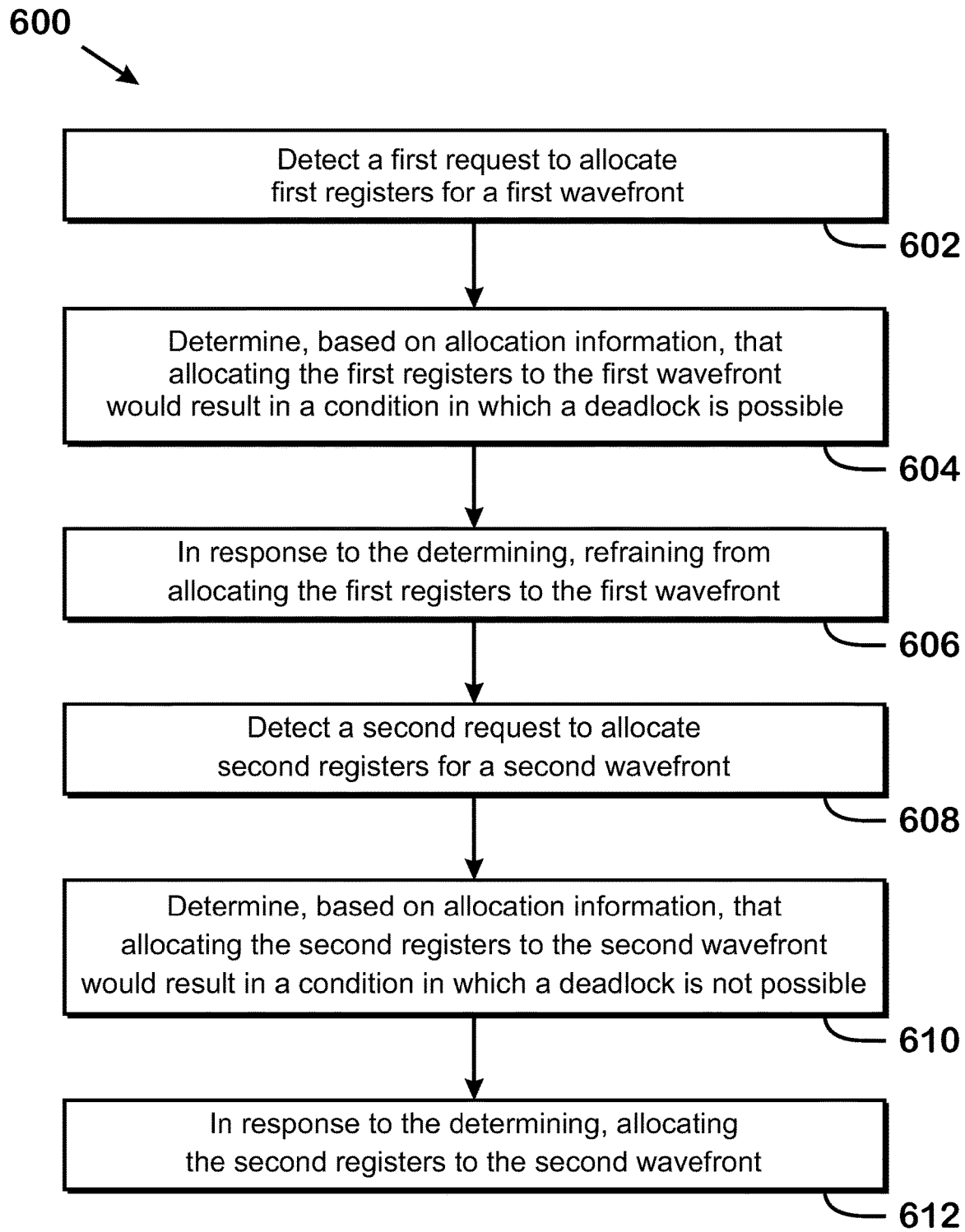
FIG. 6 is a flow diagram of a method for managing register allocation for wavefronts, according to an example.

FIG. 6 is a flow diagram of a method 600 for managing register allocation for wavefronts, according to an example. Although described with respect to the system of FIGS. 1-5, those of skill in the art will understand that any system, configured to perform the steps of the method 600 in any technically feasible order falls within the scope of the present disclosure.

At step 602, the register allocator 402 detects a first request to allocate first registers for a wavefront 408. In an example, this request is an instruction executed by the wavefront 408 that specifies a number of registers requested. In another example, the request is a request to initiate execution of the wavefront 408 with a particular number of registers allocated to that wavefront 408.

At step 604, the register allocator 402 determines, based on allocation information, that allocating registers to the first wavefront 408 would result in a condition in which deadlock is possible. In such a condition, deadlock could be possible because no wavefront 408 could complete due to not having sufficient registers. More specifically, the condition detected in step 604 is that after allocation of the registers requested at step 602, all wavefronts 408 under consideration (e.g., part of the same workgroup) could possible request a number of additional registers that is greater than the number of free registers. Since no such wavefront 408 would be guaranteed to complete, it is possible that a deadlock could occur. Three conditions have been described elsewhere herein related to situations in which deadlock is guaranteed not to occur. In some examples, step 604 involves detecting that no such condition is satisfied.

At step 606, in response to the determining, the register allocator 402 refrains from allocating the requested registers to the wavefront 408. For a wavefront 408 that is already executing, the register allocator 402 causes the wavefront 408 to stall. For a wavefront that is requested to initiate execution, that wavefront 408 does not initiate execution.

At step 608, the register allocator 402 detects a second request to allocate second registers for a second wavefront. Again, such a request could be due to execution of an instruction or due to a wavefront 408 ready to begin executing. At step 610, the register allocator 402 determines, based on allocation information, that allocating the registers to the second wavefront would result in a condition in which deadlock is not possible. In general, such a condition occurs because there are sufficient registers such that at least one executing wavefront 408 could be allocated the maximum number of registers (which includes that a wavefront 408 already is allocated the maximum number of registers). Satisfaction of any of the three conditions described elsewhere herein provides such a guarantee.

At step 612, in response to the determining of step 610, the register allocator 402 allocates the second registers to the second wavefront.

Steps 602, 604, and 606, and steps 608, 610, and 612, do not necessarily occur in sequence. Any period of time may exist between these groups of steps, in which activity such as wavefronts 408 relinquishing registers due to execution of a relinquishing instruction or due to the wavefront 408 ending, may occur.

In some examples, a wavefront 408 that is stalled due to insufficient registers being available to allocate to that wavefront 408 is resumed upon sufficient registers becoming available (e.g., one of the three conditions described elsewhere herein becoming true).

It should be understood that many variations are possible based on the disclosure herein. For example, although the techniques herein have been described as being performed on the APD 116, in other implementations, the techniques are implemented on a different processor, such as the processor 102 or a different processor. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the command processor 136, the graphics processing pipeline 134, the compute units 132, the SIMD units 138, the system 400, or the register allocator 402, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for managing register allocation, the method comprising:
   detecting a first request from a first wavefront to allocate first registers for the first wavefront while the first wavefront is executing;
   first determining, based on allocation information, that allocating the first registers to the first wavefront would result in a condition in which a deadlock is possible, wherein the first determining includes determining, after allocating the first registers, that at least one wavefront other than the first wavefront would be able to be allocated a sufficient number of registers remaining unallocated after the allocating of the first registers to complete;

in response to the first determining, refraining from allocating the first registers to the first wavefront;

detecting a second request from a second wavefront to allocate second registers for the second wavefront while the second wavefront is executing;

second determining, based on the allocation information, that allocating the second registers to the second wavefront would result in a condition in which deadlock is not possible; and in response to the second determining, allocating the second registers to the second wavefront.

2. The method of claim 1, wherein the first request comprises an instruction that requests allocation of registers to the first wavefront.

3. The method of claim 1, wherein the first request comprises a request to begin execution of the first wavefront.

4. The method of claim 1, wherein the determining, after allocating the first registers, that at least one wavefront would be able to be allocated a sufficient number of registers to complete comprises determining that after allocating the first registers a number of registers remains unallocated such that at least one currently executing wavefront could be allocated a maximum number of registers, wherein the maximum number of registers comprises a number of registers equal to the largest number of registers that the at least one currently executing wavefront requests at any point in execution.

5. The method of claim 1, wherein the second determining comprises determining that allocating the second registers to the second wavefront would result in a condition in which at least one wavefront of a plurality of wavefronts would be able to be allocated a maximum number of registers to the plurality of wavefronts.

6. The method of claim 1, wherein the second determining comprises determining that at least one wavefront of a plurality of wavefronts that includes the second wavefront is allocated a maximum number of registers allocatable to the wavefronts of the plurality of wavefronts.

7. The method of claim 1, wherein the second determining comprises determining that a number of free registers available for a plurality of wavefronts that includes the second wavefront is greater than or equal to a register headroom for the second wavefront.

8. The method of claim 1, wherein the second determining comprises determining that a number of free registers available for a plurality of wavefronts that includes the second wavefront is greater than or equal to the second registers added to a headroom of a wavefront of the plurality of wavefronts.

9. The method of claim 1, further comprising:
detecting a third request by the second wavefront to relinquish registers; and
deallocating the registers for the second wavefront.

10. A system for managing register allocation, the system comprising:
a processor configured to execute wavefronts; and
a register allocator configured to:
detect a first request from a first wavefront of the wavefronts to allocate first registers for the first wavefront while the first wavefront is executing;
perform first determining, based on allocation information, that allocating the first registers to the first wavefront would result in a condition in which a deadlock is possible, wherein the first determining includes determining, after allocating the first registers, that at least one wavefront other than the first wavefront would be able to be allocated a sufficient number of registers remaining unallocated after the allocating of the first registers to complete;
in response to the first determining, refrain from allocating the first registers to the first wavefront;
detect a second request from a second wavefront of the wavefronts to allocate second registers for the second wavefront while the second wavefront is executing;
perform second determining, based on the allocation information, that allocating the second registers to the second wavefront would result in a condition in which deadlock is not possible; and
in response to the second determining, allocate the second registers to the second wavefront.

11. The system of claim 10, wherein the first request comprises an instruction that requests allocation of registers to the first wavefront.

12. The system of claim 10, wherein the first request comprises a request to begin execution of the first wavefront.

13. The system of claim 10, wherein the determining, after allocating the first registers, that at least one wavefront would be able to be allocated a sufficient number of registers to complete comprises determining that after allocating the first registers a number of registers remains unallocated such that at least one currently executing wavefront could be allocated a maximum number of registers, wherein the maximum number of registers comprises a number of registers equal to the largest number of registers that the at least one currently executing wavefront requests at any point in execution.

14. The system of claim 10, wherein the second determining comprises determining that allocating the second registers to the second wavefront would result in a condition in which at least one wavefront of a plurality of wavefronts would be able to be allocated a maximum number of registers to the plurality of wavefronts.

15. The system of claim 10, wherein the second determining comprises determining that at least one wavefront of a plurality of wavefronts that includes the second wavefront is allocated a maximum number of registers allocatable to the wavefronts of the plurality of wavefronts.

16. The system of claim 10, wherein the second determining comprises determining that a number of free registers available for a plurality of wavefronts that includes the second wavefront is greater than or equal to a register headroom for the second wavefront.

17. The system of claim 10, wherein the second determining comprises determining that a number of free registers available for a plurality of wavefronts that includes the second wavefront is greater than or equal to the second registers added to a headroom of a wavefront of the plurality of wavefronts.

18. The system of claim 10, wherein the register allocator is further configured to:
detect a third request by the second wavefront to relinquish registers; and
deallocate the registers for the second wavefront.

19. An accelerated processing device, comprising:
a plurality of compute units, each configured to execute wavefronts; and
a command processor configured to:
detect a first request from a first wavefront of the wavefronts to allocate first registers for the first wavefront while the first wavefront is executing;

perform first determining, based on allocation information, that allocating the first registers to the first wavefront would result in a condition in which a deadlock is possible, wherein the first determining includes determining, after allocating the first registers, that at least one wavefront other than the first wavefront would be able to be allocated a sufficient number of registers remaining unallocated after the allocating of the first registers to complete;

in response to the first determining, refrain from allocating the first registers to the first wavefront;

detect a second request from a second wavefront of the wavefronts to allocate second registers for the second wavefront while the second wavefront is executing;

perform second determining, based on the allocation information, that allocating the second registers to the second wavefront would result in a condition in which deadlock is not possible; and in response to the second determining, allocate the second registers to the second wavefront.

20. The accelerated processing device of claim 19, wherein the first request comprises an instruction that requests allocation of registers to the first wavefront.

21. The accelerated processing device of claim 19, wherein the determining, after allocating the first registers, that at least one wavefront would be able to be allocated a sufficient number of registers to complete comprises determining that after allocating the first registers a number of registers remains unallocated such that at least one currently executing wavefront could be allocated a maximum number of registers, wherein the maximum number of registers comprises a number of registers equal to the largest number of registers that the at least one currently executing wavefront requests at any point in execution.

* * * * *